(12) United States Patent
Frank et al.

(10) Patent No.: US 9,054,618 B2
(45) Date of Patent: Jun. 9, 2015

(54) SAFETY CIRCUIT AND EMERGENCY POWER SUPPLY FOR GATE CONTROL CIRCUIT

(71) Applicant: Infineon Technologies Austria AG, Villach (AT)

(72) Inventors: Wolfgang Frank, Augsburg (DE); Remigiusz Viktor Boguszewicz, Essen (DE); Dirk Priefert, Moers (DE)

(73) Assignee: Infineon Technologies Austria AG, Villach (AT)

( * ) Notice: Subject to any disclaimer, the term of this patent is extended or adjusted under 35 U.S.C. 154(b) by 219 days.

(21) Appl. No.: 13/718,718

(22) Filed: Dec. 18, 2012

(65) Prior Publication Data

US 2014/0167665 A1    Jun. 19, 2014

(51) Int. Cl.
*H02P 23/00* (2006.01)
*H02P 6/24* (2006.01)

(52) U.S. Cl.
CPC ........................................ *H02P 6/24* (2013.01)

(58) Field of Classification Search
USPC ............ 318/799, 801, 400.22; 363/24, 21.04
See application file for complete search history.

(56) References Cited

U.S. PATENT DOCUMENTS

2008/0253152 A1* 10/2008 D'Angelo et al. ............... 363/24
2011/0089848 A1* 4/2011 Ohsawa ........................ 315/246

FOREIGN PATENT DOCUMENTS

DE    19804967 A1    8/1999
EP     1928077 A2    6/2008

OTHER PUBLICATIONS

"Quad/Dual N-Channel Depletion Mode EPAD Precision Matched Pair MOSFET Array," Advanced Linear Devices, Inc., ALD114804/ALD114804A/ALD114904/ALD114904A Datasheet, Rev 2.1, 2012, http://www.aldinc.com.

* cited by examiner

*Primary Examiner* — Karen Masih
(74) *Attorney, Agent, or Firm* — Slater & Matsil, L.L.P.

(57) ABSTRACT

A power supply circuit can be used to provide an alternating-current supply voltage to an electric motor. The power supply circuit is supplied by line power. The power supply circuit includes a inverter including at least one pair of transistor for generating a corresponding phase of the plurality of power supply phases. The inverter includes a transistor control circuit for switching the low-side transistor to its conducting state and the high-side transistor to its non-conducting state in case an excess voltage is detected at the input of the inverter.

21 Claims, 3 Drawing Sheets

US 9,054,618 B2

SAFETY CIRCUIT AND EMERGENCY POWER SUPPLY FOR GATE CONTROL CIRCUIT

TECHNICAL FIELD

The present invention relates generally to electronic systems and methods and, in particular embodiments, to a safety circuit and emergency power supply for gate control circuit.

BACKGROUND

Devices comprising electric motors, for example washing machines comprising an electrical motor that drives a drum via a belt drive, often are operated in the so-called field-weakening range in order to control the rotational speed and to achieve the required rotational speed of the drive. In view of efficiency considerations of the drive system electrical motors comprising permanent solenoid excitation are preferred.

Typically the electrical motor is controlled by circuitry responsible for power supplying and controlling the electrical motor in the drive, i.e., controlling the rotational speed of the motor. The supply and control circuitry itself requires a power supply.

In case of a failure in the drive system the power supply for the control circuitry may be affected in that the power supply for the control circuit is shut off or the supply voltage drops significantly, so in both cases power supply of the control circuit breaks down.

Conventional solutions provide some kind of sources for providing power supply in that event, for example large capacitors or rechargeable batteries can be provided. However, these emergency power supply sources are costly and typically require a comparatively large area on a printed circuit board or within an integrated circuit.

SUMMARY OF THE INVENTION

Embodiments of the present invention relate to electrical circuitry for controlling an inverter that may be comprised in an alternating-current converter. In particular examples, the invention relates to safety circuitry for controlling an alternating current inverter comprising pairs of transistors, wherein the safety circuitry switches the low-side transistors of the pairs of transistors to the conducting state while the high-side transistors are switched to their non-conducting state. Furthermore the safety circuitry may comprise a depletion transistor that is integrated into the current inverter and which may act as a power supply for supplying the safety circuitry.

BRIEF DESCRIPTION OF THE DRAWINGS

The invention will now be described in more detail below with reference to an embodiment depicted in the accompanying figures, wherein.

DETAILED DESCRIPTION OF ILLUSTRATIVE EMBODIMENTS

Figure 1:
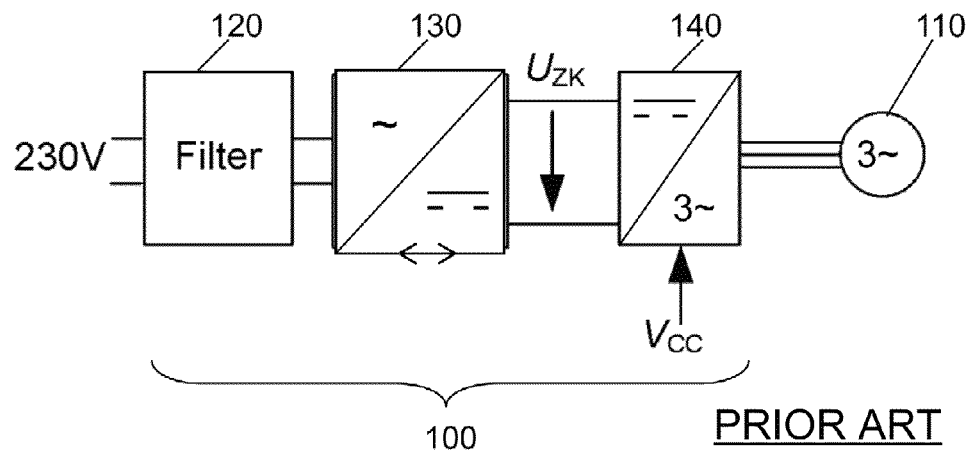
FIG. 1 depicts a block schematic of a power supply circuitry for supplying an electric motor.

FIG. 1 depicts a schematic 100 of a conventional power supply circuit that provides an alternating current power supply comprising at least one phase for an electric motor 110.

The power supply circuit may comprise a filter 120 coupled to line voltage. Line voltage typically is provided as alternating current and in one embodiment may be 230 Volt at 50 Hz frequency. However line voltage basically may be of arbitrary amplitude and arbitrary frequency, i.e., in the U.S. may be 110 Volt at 60 Hz. Note that the invention shall not be limited in this regard. Filter 120 typically is configured and adapted to block out any unwanted, i.e., parasitic, frequencies that may interfere with the subsequent circuitry. Filter 120 may be coupled with its output to a rectifier 130.

Rectifier 130 takes the filtered alternating current voltage from filter 120 as input and outputs a direct current voltage. In one embodiment the alternating current voltage may be served by a two-phase line. Alternatively the input to the power supply circuit may be tri-phase, which the filter may take as input and correspondingly outputs a tri-phase filtered output voltage that the rectifier takes as input. In any case rectifier outputs a direct current voltage $U_{ZK}$, which in the power supply circuit is an intermediate direct current voltage.

Alternating current inverter 140 takes direct current voltage $U_{ZK}$ as input and outputs an alternating current signal as required for driving electric motor 110. In one embodiment the inverter typically outputs a tri-phase output signal for driving a tri-phase alternating current motor. However, in alternative embodiments the inverter may output a signal comprising a different number of output phases for driving an electric motor requiring that different number of output phases as input, i.e., at least one phase. The invention thus may not be limited in this regard. In order to not unnecessarily obscure the invention the subsequent described embodiment relates to a tri-phase output signal.

Figure 2:
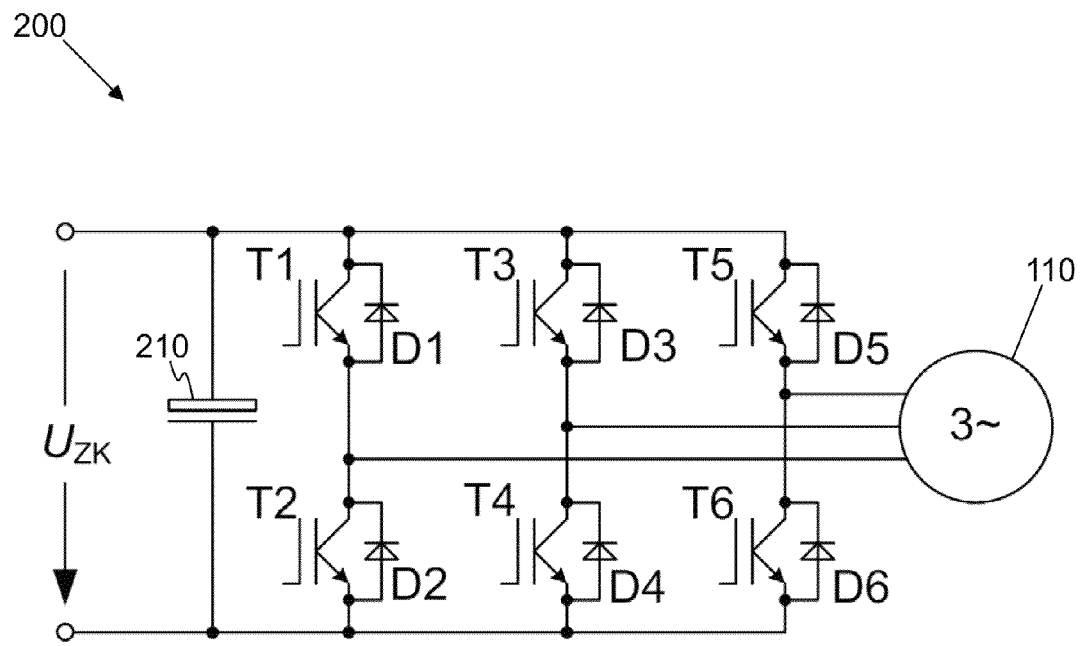
FIG. 2 depicts a schematic of a current inverter.

FIG. 2 depicts an alternating-current inverter 200 that takes direct current voltage $U_{ZK}$ as input supply and outputs a tri-phase signal for supplying electric motor 110. Note that inverter 200 corresponds to inverter 140 of FIG. 1.

The inverter comprises capacitor 210 as smoothing capacitor, i.e., in order to smoothen the input voltage $U_{ZK}$, i.e., capacitor is coupled between the input connectors of the inverter.

Furthermore the inverter comprises a switching circuit for alternately switching the direct-current voltage in order to output the tri-phase supply signal for motor 110. In one embodiment a switching circuit can be implemented by a transistor, in particular a so-called Insulated-Gate Bipolar Transistor IGBT. Without limiting the invention in this regard the switching circuit is named transistors T1-T6 in the subsequent description. The sequence of switching transistors T1-T6 to generate the clocked output signal is known from conventional circuits. Note that the circuitry required for generating the switching signals, that is the control signals applied to the gates of the transistors is not shown in the circuit. Furthermore, each of the transistors T1-T6 may optionally be equipped with a free-wheeling diode D1-D6, i.e., between emitter-collector of the respective transistor, in order to cope with peak voltages induced by the switching the transistors. Note that in this embodiment the function of transistors T1-T6 is that of switches only, i.e., the transistors are not deployed for amplifying a signal.

The transistors are arranged in pairs, wherein each pair is arranged between the high-side and the low-side of the direct-current voltage $U_{ZK}$ and wherein transistors T1, T3 and T5 are high-side transistors and T2, T4 and T6 are low-side transistors. From each pair of transistors either the high-side transistor or the low-side transistor is exclusively in conducting state thus coupling one of the phases of the electric current to either the high-side potential or the low-side of the direct-current voltage $U_{ZK}$, wherein a conventional switching sequence can be applied to the respective gates of the transistors to control the output of inverter 200.

Figure 3:
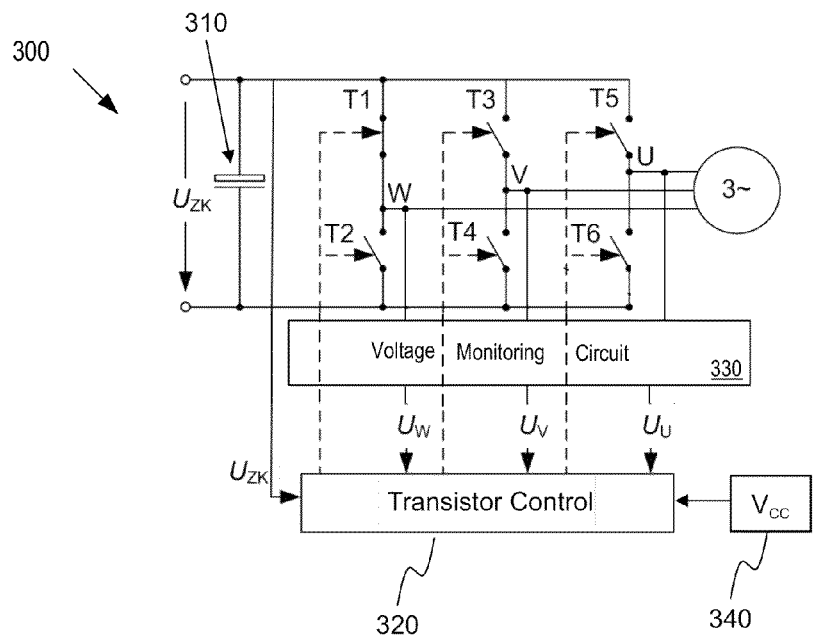
FIG. 3 depicts a schematic of a current inverter and gate control circuitry for controlling transistors of the current inverter.

FIG. 3 depicts an inverter 300 coupled to an electric motor 110. Note that transistors T1-T6 are show as controlled switches T1-T6 since these are used as switches only. In other words the depicted switching circuit can be implemented as transistors, particularly as IGBTs, and in alternative embodiments may be implemented by other switching devices.

In addition inverter 300 comprises a control circuit 320 for controlling the transistors. Basically the control circuit may be implemented arbitrarily, i.e., the invention shall not be limited to this extend. In one embodiment control circuit 320 may be implemented as part of the inverter, i.e., the control circuit is integrated in the inverter. In particular the control circuit 320 may be integrated in a so-called application specific integrated circuit ASIC, that provides the functionality of a power supply for electric motor 110. Alternatively the control circuit 320 can be implemented as a separate integrated circuit that can form part of a printed circuit board implementing a power supply for electric motor 110.

As noted above a problem may arise in case of a power supply breakdown when operating in field weakening mode. In that case control of the switches by the normal, i.e., regular control circuitry, which is not depicted in the figures, is impossible since the power breakdown cuts off the voltage supply for the regular control circuitry, while the electric motor is still turning. In that case the electric motor will not stop abruptly but will continue to turn and will act as a generator converting its kinetic energy into electric energy, which is fed into power supply 100. This scenario will continue until the energy comprised in the system is dissipated. However, the electrical energy output by the electric motor may damage inverter 300, particularly the comprised switches and the capacitor 310, because the energy by the electric motor will increase the voltage at capacitor 310 which may exceed the limits of the capacitor and/or the switches or any other component of the inverter circuitry or the rectifier 130.

Though capacitor 310 prevents abrupt voltage changes, i.e., voltage jumps, of $U_{ZK}$, the voltage across capacitor 310 may increase due to the supplied energy from the electric motor and may exceed the limits. This excess voltage may damage capacitor 310 or any other component. In case capacitor 310 is an electrolytic capacitor it may be fully destroyed by the excess voltage, which may in turn damage other components.

In order to prevent damages of inverter 300, control circuit 320 is adapted and configured to turn the low-side switches on, i.e., to switch transistors T2, T4, T6 into their conducting state, while at the same time turning the high-side switches off, i.e., to switch transistors T1, T3 and T5 to their non-conducting, i.e., blocking, state. As a consequence the electrical energy output by the electric motor circulates through the low-side transistors and is burned up, i.e., dissipated as heat thus reducing the excess voltage $U_{ZK}$. For controlling the transistors control circuit 320 is coupled to the gate of each of the transistors T1-T6 for applying a suitable gate voltage to the respective transistor.

In an alternative embodiment the high-side switch transistors, i.e., T1, T3 and T5 may be switched on, i.e., switched to conducting, while the low-side transistors T2, T4 and T6 are turned off, i.e., switched to their blocking state. The electrical energy output by the electric motor then circulates through the high-side transistors and is burned up. In still another embodiment the high-side and low-side transistors can be switched alternately switched to their conducting state, thus burning the electric energy in either the high-side or the low-side transistors respectively while at the same time allowing the low-side or the high-side transistors to cool down. In this way the electric energy is burned up in the transistors, i.e., dissipated as thermal energy, thus preventing damage from the circuitry.

Inverter circuitry 300 furthermore comprises voltage monitoring circuit 330 for monitoring voltage $U_{ZK}$, which is communicatively coupled to transistor control circuit 320. Since the drain voltage of each high-side transistor T1, T3 or T5 in its on-state nearly, i.e., except for the voltage drop caused by the conducting channel of the respective transistor, equals voltage $U_{ZK}$, the voltage monitoring circuit with its one end is coupled to the drain of each high-side transistor T1, T3 and T5. Voltage monitoring circuit 330 in this way monitors the drain voltage of each high-side transistor and indicates an excess voltage of $U_{ZK}$ to transistor control circuit 320 in case at least one of the monitored drain voltages exceeds a predefined threshold value. The indication of an excess voltage of $U_{ZK}$ thus triggers control circuit 320 to shut off all high-side transistors of the transistor pairs and to switch the low-side transistors to their conducting state. Voltage monitoring circuit 330 may be implemented in any conventional way. In one embodiment voltage monitoring circuit 330 can be implemented as a voltage divider, optionally in combination with at least one Zener-diode or a plurality of cascoded Zener-diodes. Note that any other conventional implementation of a voltage monitoring circuit can be used; the invention shall not be limited in this regard. A divided voltage exceeding a predefined threshold or a Zener-diode forwarding a threshold voltage to transistor control circuit 320, signalizes an excess voltage $U_{ZK}$.

A detection of an excess voltage of $U_{ZK}$ not only indicates that any component may be damaged by that voltage, but furthermore indicates that most probably there is a major breakdown of the power supply line. As a consequence the power supply voltage of transistor control circuit may also be affected, i.e., transistor control circuit 320 cannot be coupled to the normal power supply, since that voltage may exceed the normal specifications. To provide a supply voltage transistor control circuit 320 may be coupled to $U_{ZK}$ via at least one depletion transistor—not shown in FIG. 3—operated in current source mode, which serves as an internal power supply 340. This is possible since only the circuitry of transistor control circuit 320 has to be provided with sufficient power, which in turn has to provide control signals to the transistor gates of the high-side and low-side transistors.

In one embodiment the depletion transistor is implemented as an integral part of the power supply circuitry.

Figure 4:
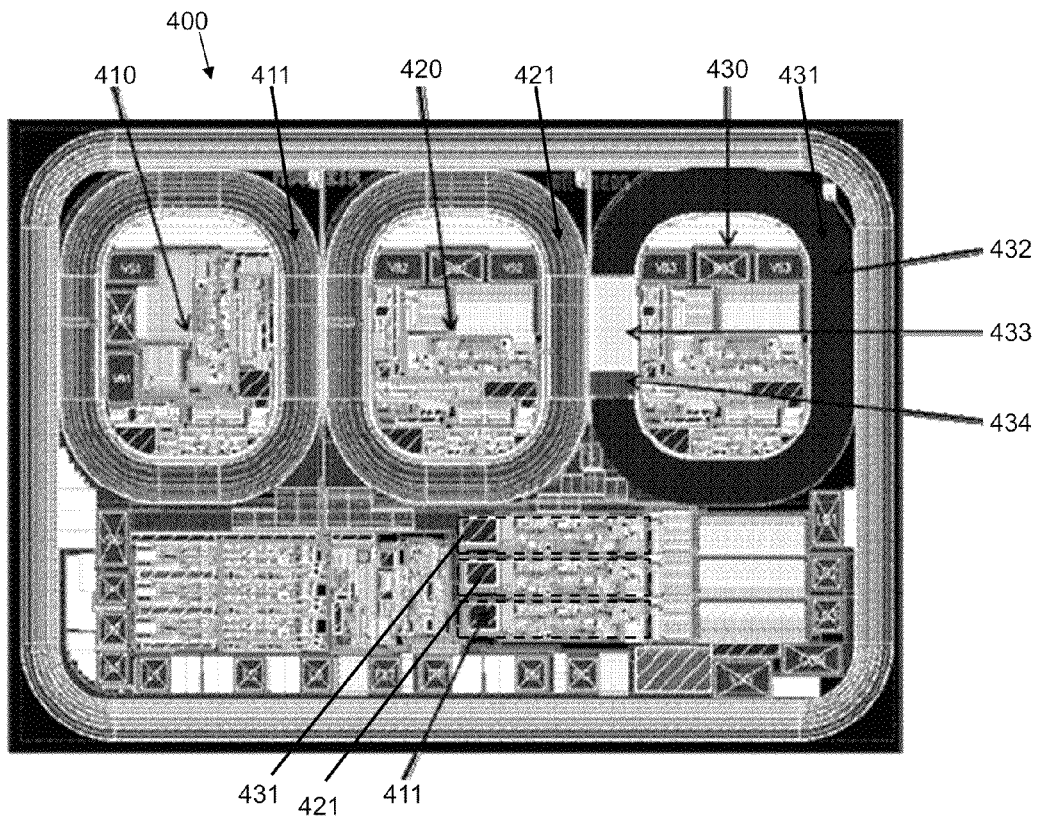
FIG. 4 depicts a topology arrangement of functional blocks of the power supply circuit.

FIG. 4 depicts a semiconductor layout 400 of functional components of an electric power supply 100 that provides a tri-phase output supply voltage. Corresponding to the number of output phases there are three nearly identical sections 410, 420 and 430 surrounded by oval shaped semiconductor structures 411, 412 and 413 defining the respective area of sections 410, 420 and 430. In one embodiment section 410 may be the area comprising the circuitry, i.e., the driver circuitry, for controlling the high-side transistor of phase U while section 420 defines the area of control circuitry for controlling the high-side transistor of phase V and section 430 defines the area of control circuitry for controlling the respective high-side transistor of phase W. Each of the areas 410, 420 and 430 is of floating electrical potential, thus each area may have a potential of $U_{ZK}$ or reference ground or any intermediate potential depending on an operating status of the circuit, while the area outside these areas basically is of low-side potential or reference ground. The circuitry for controlling the low-side transistors of the transistor pairs is arranged in sections 411, 421 and 431.

Each oval structure is segmented into functional sections, wherein in the following the segmentation of oval structure 431 is described. In one embodiment the structure comprises a bootstrap diode in area 432, a level shifter transistor located in area 433 and a depletion transistor located in area 434. As depicted in FIG. 4 area 434, i.e., the area of the depletion transistor adjoins the inner area 430, i.e., the area of floating potential, and at its opposite side adjoins a small area of low-side or reference ground potential, wherein the low-side potential area may be located between two oval structures. Furthermore the area of the depletion transistor is arranged in the vicinity of the level shifter transistor in area 433.

Figure 5:
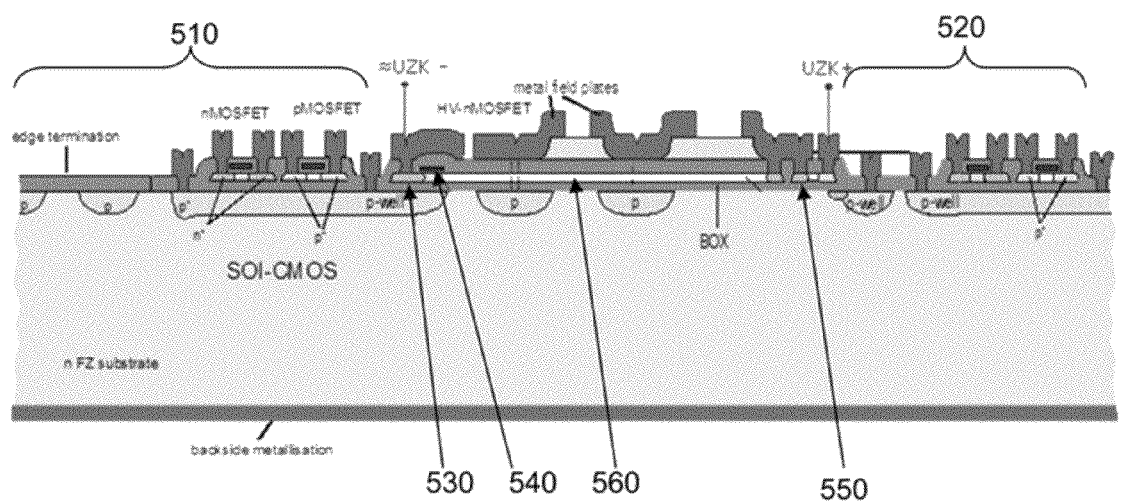
FIG. 5 depicts a section view of a semiconductor topology of a depletion transistor.

FIG. 5 depicts a section view of the depletion transistor arranged in area 434. In one embodiment the transistor is implemented as a CMOS device in silicon-on-insulator technology, i.e., SOI, so the depletion transistor may be implemented as a SOI-CMOS device.

As noted above the depletion transistor is arranged between an area 510 having reference ground or low-side potential, and an area 520 having a floating potential higher than reference ground or low-side potential. Accordingly the source 530 of depletion transistor is arranged in the close vicinity of that area 510 and is electrically coupled to that potential. Gate 540 is arranged in close vicinity to the source in order to enable to shut down a conducting channel by applying a negative control voltage. Drain 550 is arranged in the close vicinity of area 520, i.e., the floating potential area, and is coupled thereto. Consequently there is a flow of electrons from source to drain corresponding to a current flow from drain to source in silicon layer 560, if the depletion transistor is in conducting state, i.e., the transistor is not shut off by applying a gate voltage.

During regular operation, i.e., as long as there is no power supply breakdown, the depletion transistor may be shut-off to its non-conducting state by applying suitable control voltage to its gate, thus lowering energy consumption of the circuit during regular operation. However the invention shall not be limited to this regard. Consequently, since the depletion transistor provides the supply voltage to transistor control circuit 320, the transistor control circuit 320 is shut off during regular operation of power supply circuitry 100. In case of a breakdown of the line power supply the gate control voltage of the depletion transistor is no longer applied thus enabling the current flow through the transistor and thus providing a power supply for transistor control circuit 320. In this way transistor control circuit 320 is shut off during regular operation, i.e., as long as line supply is provided, and is activated in case of a breakdown of line supply.

In this way the depletion transistor is integrated into the semiconductor structure of the inverter and forms an internal power supply for transistor control circuit 320 in case of a line supply failure, wherein the structure of the depletion transistor can be arranged and located in the oval semiconductor structures 431. Thus the structure of the depletion transistor does not require additional chip surface area.

Note that additional depletion transistors can be arranged with oval structures 411 and/or 421, so there may be a plurality of depletion transistors for providing supply voltage to transistor control circuit 320.

Note that in alternative embodiments of the circuit, not shown in the figures, other energy sources may be used for providing power to transistor control circuit 320. In one alternative embodiment the circuit may comprise a separate, additional area within the substrate, also not depicted in the figures, that is maintained at a higher potential during regular operation. In this way, the area serves as an energy storage. Instead of being coupled to any of the floating potential areas 410, 420, 430 the depletion transistor can be coupled to that separate, additional area, which in case of a power supply failure may serve as energy source for the transistor control.

Furthermore note that in this description the depletion transistor serves as one embodiment of a supply device for providing an integrated power supply coupled to an area of higher potential. In alternative embodiments the supply device may be implemented by a chain of Zener diodes.

The described safety circuitry, i.e., transistor control circuit 320, thus allows to monitor the intermediate direct-current voltage $U_{ZK}$ using a voltage monitoring circuit that is communicatively coupled to the transistor control circuit 320. During regular operation of power supply circuit 100 transistor control circuit 320 is switched off. In one embodiment this can be achieved by switching the depletion transistor to its non-conducting state thus cutting off the supply voltage of transistor control circuit 320.

Upon detection of an excess voltage of $U_{ZK}$, which may indicate a breakdown of power line supply, transistor control circuit 320 may be activated. In one embodiment this can be achieved by switching the depletion transistor, which serves as a power supply for the transistor control, to its conducting state. Considering that the depletion transistor is switched to its non-conducting state by applying a negative gate voltage, the depletion transistor may switch to conducting automatically in case of a power line supply breakdown, thus activating transistor control circuit 320 automatically in that case. As soon as transistor control circuit 320 is active, i.e., supplied with power, it switches the high-side transistors of the inverter to their non-conducting sate and the low-side transistors to their conducting state, thus burning any electrical power in the low-side transistors generated by the electric motor.

Since the depletion transistor as well as transistor control circuit 320 can be implemented using SOI technology, the safety circuitry can be integrated in a power supply chip, i.e., on the same substrate chip, thus providing an efficient and cheap circuit for preventing damage of the circuitry in case of a power line supply breakdown.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An electric power supply comprising:
   a current inverter configured to supply an electric motor, the current inverter comprising a pair of transistors coupled to an intermediate direct-current supply voltage, the current inverter adapted for providing an alternating current to the electric motor; and
   a transistor control circuit coupled to gates of the pair of transistors, the transistor control circuit configured to switch a high-side transistor of the pair of transistors to its non-conducting state and a low-side transistor of the pair of transistors to its conducting state in case of a breakdown of the direct-current voltage supply.

2. The electric power supply of claim 1, wherein the transistor control circuit is switched off while operating under regular conditions.

3. The electric power supply of claim 1, further comprising:
   a voltage monitoring circuit configured to detect an excess voltage in the inverter; and
   a depletion transistor in current-source mode configured to serve as a power supply for the transistor control circuit.

4. The electric power supply of claim 3, wherein the depletion transistor is arranged between an area of floating potential and an area of low-side potential.

5. The electric power supply of claim 4, wherein the inverter comprises insulated gate bipolar transistors and the depletion transistor is implemented as a CMOS transistor.

6. An inverter for providing an alternating-current supply voltage of a phase, the inverter comprising:
   a high-side transistor arranged to couple the phase to a direct-current supply voltage;
   a low-side transistor arranged to couple the phase to a low-side supply voltage; and
   a transistor control circuit configured to switch the high-side transistor to its non-conducting state and the low-side transistor to its conducting state upon detecting an excess voltage of the direct-current supply voltage.

7. The inverter of claim 6, further comprising a voltage monitoring circuit configured to detect the excess voltage of the direct-current supply voltage.

8. The inverter of claim 6, further comprising a depletion transistor in current-source mode configured to serve as a power supply for the transistor control circuit.

9. The inverter of claim 8, wherein the depletion transistor is arranged between an area of high-side potential and an area of low-side potential.

10. The inverter of claim 8, wherein the transistor control circuit is implemented in silicon-on-insulator technology and the depletion transistor is implemented as a CMOS transistor.

11. An electric power supply comprising:
    inverter means for providing an alternating-current voltage to an electric motor, the inverter means comprising a switching circuit coupled to an intermediate direct-current supply voltage; and
    control means coupled to the inverter means, wherein the control means for switching a high-side of the switching circuit to its non-conducting state and a low-side of the switching circuit to its conducting state in case of a breakdown of the direct-current supply voltage.

12. The electric power supply of claim 11, further comprising voltage monitoring means for detecting an excess voltage of the direct-current supply voltage.

13. The electric power supply of claim 11, further comprising power supply means for supplying the control means in case of a breakdown of the direct-current supply voltage.

14. The electric power supply of claim 13, wherein the power supply means is implemented as a semiconductor structure and wherein the power supply means comprises a depletion transistor in current-source mode arranged between an area of floating potential and an area of low-side potential.

15. The electric power supply of claim 13, wherein power supply means is switched off under regular operating conditions.

16. A method for operating an electric power supply supplying an electric motor, the power supply comprising a pair of transistors coupled to an intermediate direct-current supply voltage, the method comprising:
    monitoring the intermediate direct-current supply voltage for an excess voltage; and
    switching a low-side transistor of the pair of transistors to its conducting state and a high-side transistor of the pair of transistors to its non-conducting state when an excess voltage at the direct-current intermediate voltage is determined by the monitoring.

17. The method of claim 16, wherein the electric power supply comprises a depletion transistor in current-source mode as a power supply for a transistor control circuit that is configured to switch the low-side and high side transistor when the excess voltage is determined.

18. The method of claim 17, further comprising switching the depletion transistor from its non-conducting state to its conducting state when the excess voltage is determined.

19. The method of claim 17, wherein the depletion transistor is arranged between an area of floating potential and an area of low-side potential.

20. A method for operating an inverter comprised in an electric power supply, the inverter providing at least one phase of an alternating-current voltage to an electric motor, the method comprising:
    providing an intermediate direct-current voltage to the inverter;
    monitoring the voltage of the intermediate direct-current voltage; and
    upon detecting an excess voltage of the intermediate direct-current voltage, switching a high-side transistor of the inverter to its non-conducting state and a low-side transistor of the inverter to its conducting state.

21. The method of claim 20, further comprising switching a depletion transistor of the inverter to its conducting state upon detecting the excess voltage of the intermediate direct-current voltage, the depletion transistor providing power for switching the high-side and low-side transistors.

* * * * *